April 4, 1961 C. L. WILSON 2,978,350
CERAMIC GLAZED VITRIFIED TILE AND METHOD
AND APPARATUS FOR MAKING THE SAME
Filed Feb. 6, 1958 2 Sheets-Sheet 1

INVENTOR.
Charles L. Wilson,
BY
John H. Leonard,
his ATTORNEY.

April 4, 1961

C. L. WILSON 2,978,350

CERAMIC GLAZED VITRIFIED TILE AND METHOD
AND APPARATUS FOR MAKING THE SAME

Filed Feb. 6, 1958

INVENTOR.
Charles L. Wilson,
BY
John H. Leonard,
his ATTORNEY.

United States Patent Office 2,978,350
Patented Apr. 4, 1961

2,978,350

CERAMIC GLAZED VITRIFIED TILE AND METHOD AND APPARATUS FOR MAKING THE SAME

Charles L. Wilson, Brazil, Ind., assignor to American Vitrified Products Company, Cleveland, Ohio, a corporation of New Jersey Filed Feb. 6, 1958, Ser. No. 713,701

6 Claims. (Cl. 117—18)

This invention relates to vitrified tiles, and particularly to ceramic glazed vitrified drain tiles of the bell and spigot type, and to a method and apparatus for handling and manipulating the tiles during processing, for applying the ceramic glaze composition thereto, and for otherwise preparing the tiles for efficient charging and firing in the kiln.

Heretofore, ceramic glazes have been formed on chinaware and other clay products of like category by manually applying thereto, before firing, a slurry of ceramic glaze forming composition. Such compositions produce an excellent glazed surface on the article but their manual application by spraying, painting, dipping, or otherwise, requires the manual handling of each article individually. This is particularly true where certain areas of the surface of the articles are to be left unglazed, either because of the requirements of the finished article or because of phenomena occurring during the firing procedures. The prior ceramic glaze applying procedures are, accordingly, very time consuming and expensive, so much so that the cost can be absorbed only in the price of relatively expensive clay products.

It is desirable, for many purposes, to have, on vitrified tiles, such as the conventional bell and spigot type of drain tiles, a high quality ceramic glaze surface which heretofore has been provided only on more expensive clay products. Ceramic glazes provide surfaces which are uniform in quality, strong, and resistant to soil acids and to chemicals. They can be produced in various selected colors.

However, due to manufacturing procedures necessary to produce such tiles economically, it is not practical by prior coating methods and techniques, to apply a glaze slurry to the tiles. For example, the tiles must be produced to sell at a very low price, and it is entirely impractical economically and otherwise to handle each tile individually during the application of a slurry of ceramic glaze material on the surface.

Accordingly, instead of glazing with ceramic glazes, the customary prior practice, in the case of vitrified tiles of this character, is to introduce salt glaze material into the fire of the kiln so that it is carried in gaseous form throughout the kiln and produces a salt glazed surface on the heated tiles. The salt glaze procedure has endured despite the superiority of ceramic glazes.

Attempts have been made to apply to unburned drain tiles slurries of ceramic glaze material, such as conventionally used on chinaware and more expensive pottery, by spraying the slurry onto the tiles. In quantity production, the spray application of the slurry can be accomplished readily insofar as concerns the interior of the tiles inasmuch as a single spray nozzle can be run through each tile and withdrawn, leaving the interior of the tile properly coated. However, insofar as concerns the exterior of the tiles, this cannot be done readily. Generally, the tiles are rolled down the racks after issuing from the extrusion die and end shaping equipment. Even if spraying or painting equipment could be arranged to apply the slurry on a tile, during rolling, so as to cover the entire peripheral outer surface, the sprayed outer surface would be marred subsequently by the racks and supports down which the tile is rolled.

More disastrous to economic production is the fact that a substantial part of the slurry of glaze material would reach the handling apparatus, work into the bearings, and the like, and render the apparatus useless until cleaned and repaired, unless very expensive ventilating and other preventative equipment were provided. But cleaning and repairing of the apparatus and removal of the composition is time consuming and expensive and necessitates substantial "down" time of the equipment.

In some instances, attempts have been made to handle tile of this character during processing by supporting them on suitable rods. The rods are arranged one rod to each tile, each rod extending through its associated tile and having a hook at its lower end which engages around the lower edge of its associated tile and thus supports the tile thereby in generally upright position with the rod in the tile and protruding therefrom at the upper end. Such supporting rods, however, are not suitable for dipping the supported tile in a tank or transporting it after dripping, inasmuch as the rods damage the glazed coating due to their contact therewith during dipping and subsequent handling and the resultant tendency to become stuck to the coating, or to their striking and marring the coating during their removal or the transportation of the tiles while the tiles are suspended thereon.

Again, racks have been provided in which vertically spaced rows of horizontally disposed and horizontally spaced rods are arranged to be inserted in the tiles and the tiles thus supported on the rods in horizontal position. This practice, likewise, is unsatisfactory for dipping and transporting the tiles inasmuch as the glaze coated surface is damaged by the contact with rods and, furthermore, the tiles are not in the proper position either for effective coating or for positioning in the kiln or in proper position for processing at subsequent stations.

Accordingly, ceramic glazed vitrified tiles of this character have not been produced heretofore.

To assist in understanding the present invention, it is pointed out that one method of producing vitrified tile is by extrusion, the tiles frequently being extruded horizontally. They are then rolled down a rack and the ends shaped. Next, they are assembled, one at a time, spigot end downwardly, on a common pallet to provide a group for subsequent handling. The tiles are transported as a group, while resting on the pallet, to a drier and are there dried, usually by the application of forced air drafts and heat. Next, they are transported, while remaining on the same pallet, to the kiln and there removed from the pallet. Each tile, as removed, is stood upright, spigot end downwardly, on its own individual soft clay levelling ring which is first positioned on the floor of the kiln, whether the floor be that of a stationary batch kiln or the truck floor of a continuous type kiln. Next, the top surfaces of the rings are sanded by broadcasting the sand by hand over the rings, the sand or parting material on the top of the rings being provided to prevent their bonding, during firing, to the lower ends of the tiles supported thereon, respectively. As a result of this top sanding operation, the sanding of the top surface is not in all cases as uniform as desired, and a large amount of the sand falls to the floor areas exposed within or between the rings. After firing and cooling, the tiles and rings are removed.

However, in this prior method, the large amounts of sand scattered on the floor, during sanding of the ring tops, drop into the openings, crevices, and ducts in the floor and there accumulate and interfere seriously with the proper and efficient flow of heated products of combustion to the charge in the kiln. Further, the rings frequently become bonded so tightly to the tile as to require fragmentation of the rings for their removal. Sometimes the bonding of the rings to the tiles is so tight as to result in defective tiles. In any event, the smaller fragments of the rings occurring for any reason fall into the openings, crevices, and ducts in the floor, aggravating the condition caused by the sand. Due to their deleterious interference with the application of heat to the tiles, the sand and fragments must be removed frequently and this requires considerable "down" time of the kiln and also labor for disassembly of the floor, removal of the sand and fragments, and rebuilding the floor, if a periodic kiln, and additional cleaning if a tunnel kiln.

Further, the transport and handling of the tiles in a group on a common pallet is unsatisfactory in many respects, particularly if the tiles are to be dipped in a glaze slurry. First, the assembled group of tiles must be carefully handled to prevent their toppling over on the pallet during transport. In dipping, the pallet makes it difficult to obtain a proper coating both inside and outside. The slurry tends to build up in a puddle at the lower or spigot ends of the tiles and this puddle hardens into an irregular mass of glaze material which tends to bond to the tiles. Unless carefully removed by hand, the mass of glaze material will be carried into the kiln on the tile when the tile is charged in the kiln. Again, the pallets must be cleaned frequently—a very messy, wasteful, and costly operation.

In accordance with the present invention, the disadvantages of the prior methods are eliminated.

The tiles are more efficiently handled in the various processing steps, and are transported more efficiently from one operating station to another, and are loaded and unloaded more readily when necessary during processing at each and every station.

By the present method, unfired formed tiles are handled concurrently in groups throughout all the various steps beginning with transport from the forming station, during the application of the ceramic glaze composition, and during the application of parting materials to the lower ends on which the tile are to rest in the kiln for preventing them from sticking to the supporting rings or other supporting surfaces in the kiln without the necessity of sanding the supporting surfaces on which the tile are to be placed. In accordance with prior procedures, after several tiles have been formed, they are placed in upright position, spigot end downwardly, on a common supporting pallet with the tiles arranged in spaced relation to each other in rows and the rows in laterally spaced parallel relation to each other. In the prior methods, the tiles usually are dried while thus supported on the common pallet.

In accordance with the present method, either before or after drying, all of the tiles in the group are concurrently engaged beneath the exterior of their bells by a common supporting rack and suspended by their bells therefrom, as a group, so that they remain in their original position relative to each other.

While thus suspended, they are transported as a group to the succeeding work site which, in the preferred method wherein they are dipped after drying, is the dipping station.

At the dipping station they are completely immersed, as a group, into the slurry of the glaze material, either by lowering the rack to lower them into a tank of the slurry or by lifting the tank of slurry to engulf them while the rack remains in transporting position, or by combination of both.

If the tiles have first been dried, it is preferable that they be immersed while they retain a substantial quantity of the drying heat so as to cause rapid drying of the applied coating of slurry.

After immersion, the tiles preferably are removed, as a group, from the slurry and, while suspended from the rack, transported to a convenient site or operating station where parting material is applied to their bottom ends before the glaze coating is dry. This is accomplished either by lowering the rack to dispose the tile upright, spigot ends at bottom, onto a surface covered with a level layer of the parting material or by raising the surface so coated with parting material to apply the material against the lower or spigot ends of the group of tiles. In either event, the movement between the rack and the surface is such as to temporarily transfer the weight of the tiles from the rack to the layer of parting material so that the weight assists in causing adherence of the parting material to the moist or wet glaze on the lower ends of the tiles.

Having applied the parting material to the lower ends, the tiles are again suspended by lifting the rack, without changing their positions relative to each other, and are transported, as a group, while suspended on the rack by their bells, to the next operating station which may be the kiln or temporary storage.

If the next station be a temporary storage, the tile are merely lowered onto a floor or common storage pallet where they remain, in the relative positions in which they were supported on the rack, until it is desired to remove them for charging the kiln. After they are lowered onto the floor or a pallet, the rack is lowered out of contact with the bells and withdrawn endwise of the rows of tiles.

When they are subsequently to be removed to the kiln, the rack may be operated to insert its supporting arms endwise between the rows and then lifted, as in the first instance, so as to engage the arms beneath the bells and lift the tiles of the group concurrently.

If the next operating station, after the application of the parting materials, is the kiln, the tiles are transported, without being removed from the rack, from the station at which the parting material was applied to their lower ends, and transported to the kiln and there removed directly from the rack or placed as a group on a pallet from which they are subsequently individually removed.

As they are removed for charging, each is placed on its individual soft clay leveling or supporting ring on the kiln floor without prior sanding of the upper supporting surface of the ring with parting material.

Some of the steps of the foregoing method may be modified, although at some sacrifice in advantages. One modification resides in the fact that, instead of dipping the tiles and then lowering them onto a layer of parting material to cause adherence of the material to the lower or spigot ends of the tiles, the tiles, prior to dipping, may be lowered concurrently as a group onto a surface or into a pan which supports a shallow bath or thin layer of "hard to wet" material, such as hot wax or oily material, so as to coat therewith substantially only the end surfaces of the tile or, at most, the end surfaces and the peripheral surface for a short distance upwardly, lengthwise of the tile, from the end surfaces. The waxy or oily coating is one which adheres to the tile and prevents wetting of the tile ends by the glaze slurry during dipping of the tiles in the slurry.

After the application of this hard to wet material, the tile are supported, as a group, by the rack and concurrently completely immersed in the slurry, as before, and withdrawn promptly, with the result that little or no slurry adheres to the waxed or oiled ends. The tiles are then transported, as a group, to the kiln or to storage, as heretofore described. However, in this alternative method, if optimum results and a minimum of rejects are to be obtained, it is safer to sand, at least to some extent, the top surfaces of the supporting rings in the kiln.

A second alternative is to suspend the tiles, by engaging them beneath their bells as before, while they are green and before drying, and then concurrently to manipulate them with the rack and to treat them by either of the alternative methods heretofore described, and then to place them on a pallet or floor for drying. This alternative method is limited, however, inasmuch as many types and compositions of tiles are too weak to be suspended by the bells before drying. If it is necessary to dip the tiles while green and they are too weak to be supported by the bell, they can be dipped only while standing on the pallet, a procedure to be avoided, if possible, for reasons heretofore pointed out.

In each of the alternative methods, as mentioned, instead of transporting the tiles directly to the kiln, the tiles may be transported to a temporary storage, the choice in such instances being dictated by matters extraneous to the method and apparatus, such as holidays, the number of kilns, and the like.

Accordingly, in a number of claims, the term "subsequent operating station" is used to designate broadly either the kiln, or the storage, or some station which is subsequent to the specific one recited and at which an operation or step is performed on, or with respect to, the tile.

The greater efficiency of the present method, regardless of the number of steps performed, is obtained over corresponding steps performed in accordance with prior methods. Regardless of the present alternatives used, the advantage of handling the tiles in groups greatly reduces the cost of manufacture and assures a more consistent product. The additional handling steps for dipping and for applying parting material and the like do not complicate the steps which were originally required for handling before the newer steps were included. On the contrary, certain advantages are obtainable by the group handling in accordance with the present method and apparatus even when the steps of treating the ends of the tile with parting material or hard-to-wet material are not practiced.

Various other objects and advantages of the invention will become apparent from the following description wherein reference is made to the drawings which illustrate a preferred embodiment of the invention, and wherein.

Figure 1:
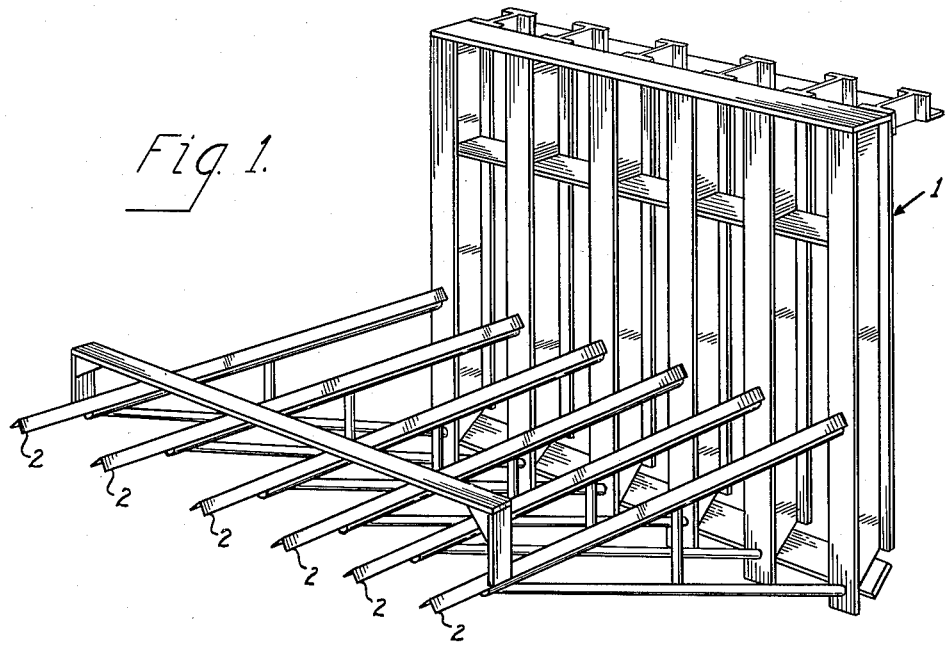
Fig. 1 is a perspective view of a rack suitable for handling a plurality of bell and spigot tiles concurrently in the practice of the steps of the present invention.
Figure 2:
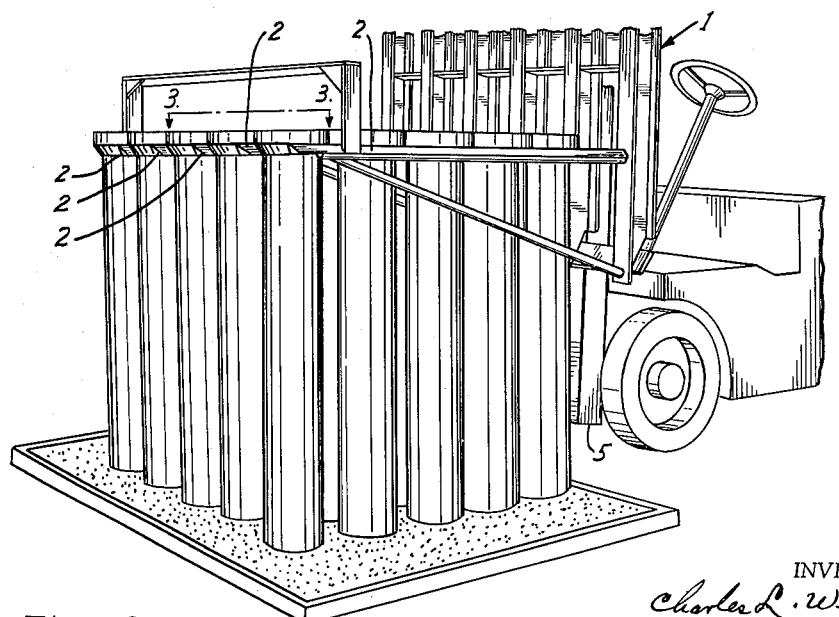
Fig. 2 is a perspective view of a loaded rack, illustrating one operating step in the method.
Figure 3:
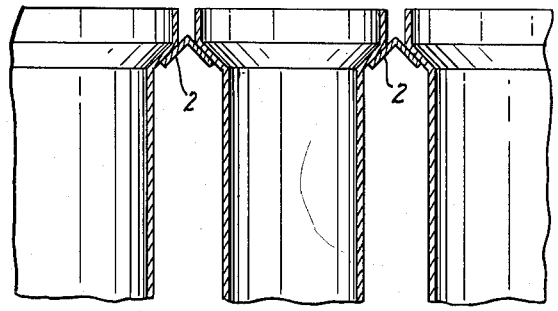
Fig. 3 is a vertical cross sectional view taken on the line 3—3 of Fig. 2.
Figure 4:
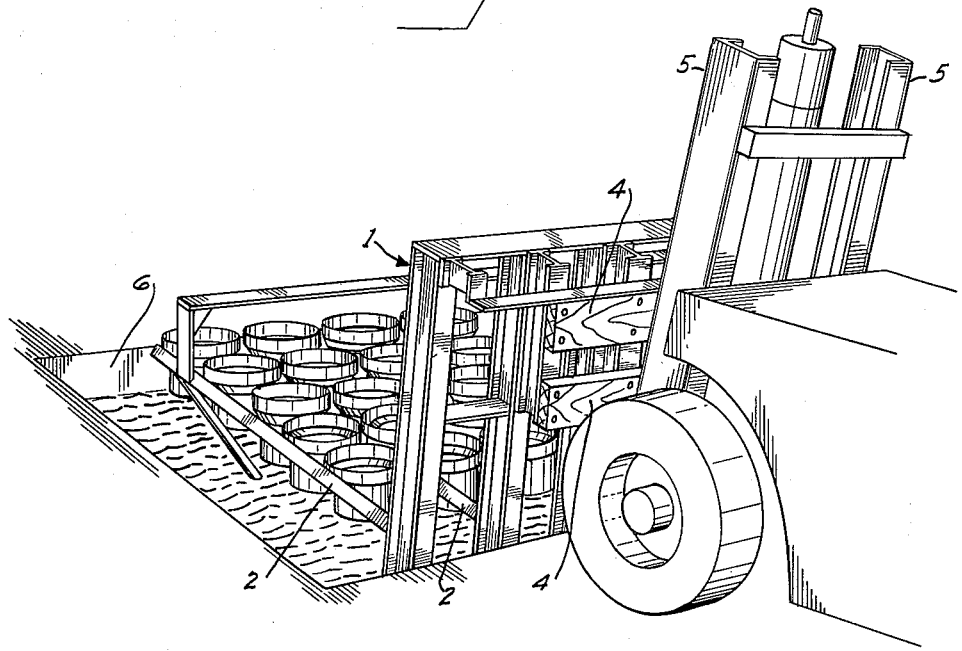
Fig. 4 is a perspective view illustrating the dipping step of the present invention.

As mentioned it is desirable from the standpoint of practical economical production that the tiles be handled in groups and, for this purpose, the apparatus illustrated in Fig. 1 is utilized.

This apparatus comprises essentially a rack in the form of an upright frame 1 having a plurality of generally horizontally extending arms 2 which are in laterally spaced parallel relation to each other and which extend forwardly and rearwardly of the frame 1. Each of the arms 2 may be in the form of an angle iron disposed with the intersection of its two sides upwardly. The arms 2 preferably are coplanar and are spaced apart from each other transversely of the frame 1 a predetermined distance dependent upon the diameter of the particular tiles to be handled thereby.

It is desirable that the tiles be supported in suspension in upright position from the frame and so held that as the rack is being lowered, they can move independently of each other, and relative to the rack, vertically when their lower ends strike any obstructing surface, and thus can accommodate themselves with their lower ends resting on the obstructing surface. Accordingly, the arms are arranged so that, with the tiles arranged in rows upright with their bell ends at the top, the arms can enter endwise between the rows and engage the tiles at the underside of the bells.

The frame 1 is mounted on a suitable slide 4 which is mounted on a vertical support 5 for sliding movement vertically. The slide 4 may be the vertical lift slide of an ordinary hoist dolly truck commonly used in industrial establishments for hoisting lifts of material by engagement of forwardly extending prongs beneath suitable pallets. This type of structure has the advantage in that it not only can hoist the tile but the truck itself is mobile so that the hoisted tile can be transported to different positions about the factory site.

Since many tiles are to be handled concurrently, the arms 2 are preferably arranged so that a plurality of tiles can be arranged in a row extending forwardly and rearwardly of the rack, and a plurality of rows can be arranged side by side laterally of the rack. The arms are unobstructed and unconnected from each other from their outermost ends for a major portion of the distance from their outermost ends toward the frame 1. Thus the arms can be inserted between adjacent rows of tiles by moving the arms endwise, transversely of the axes of the tiles, while the tiles are in upright position with the bell ends upwardly and the arms are below the level of the bells. When raised, the arms engage under the exteriors of the bells and lift the tiles clear of their support and suspend them by their bells while the tile remain in their original positions relative to each other.

The arms 2 are preferably of such width laterally of the support that each arm supports one side of a row of tiles at the face on one side of its crest, and another row of tiles at the face on the other side of its crest. Thus a group or charge of tiles can be supported in spaced relation to each other in regular rows extending forwardly and rearwardly and transversely of the rack. The arms have substantially only line contact with the bells.

As heretofore mentioned, the dry clay tiles, when ready to be coated with the ceramic glaze, are to be coated in a group by completely immersing them in a slurry of the ceramic glaze composition while they are supported on the rack, either by lowering the rack to lower the tiles into the slurry or by elevating the container of slurry to engulf the tiles. If the end surfaces of the spigot ends of the tiles are to be coated with parting material, the group of tiles, while suspended on the rack, are removed from the slurry and caused to rest, under their own weight, on a level surface layer of suitable parting material. This is done either by lowering the racked tiles onto the material or by raising the support for the material so as to cause the material to engage the lower ends of the tiles and lift them relative to the rack slightly to transfer their weight temporarily onto the material. Any conventional parting sand or composition may be used.

By relative lowering of the rack a distance slightly more than is necessary to cause the tile to rest on the surface, it is assured that the weight of all of the tiles, even tiles which are slightly shorter than normal, is transferred onto the layer of parting material inasmuch as temporarily they are not supported by the rack.

This manipulation has the advantage that the weight of each tile is used to press it firmly against the layer of whatever material is to be applied, so as to cause better adherence of the material to the spigot ends of the tiles.

If the alternative method of applying "hard to wet" material, such as wax or oil, to the end surfaces of the spigot ends is used, then to assure adherence, such material is heated or conditioned so that it will adhere readily to the tile if applied thereto under light pressure, and the rack is then manipulated as described to apply the material to the tile ends in a group.

Dipping in either event is readily effected merely by lifting the rack of tiles, then operating the truck to transport the lifted rack over the tank 6, then lowering the rack to immerse the tiles completely in the slurry of the particular ceramic glaze composition to be applied to the surface of the tile.

The ceramic glaze composition may include such materials as frits, nephelite, syenite, and talc or any of the conventional glass forming ceramic glazes; for example, those customarily used for glazing dishes and the like, and the more expensive ceramic glazed pottery.

The slurry is brought to the consistency desired by use of a suitable liquid carrier which generally is water, sometimes with other conditioners added.

After the tiles have been immersed sufficiently long to be coated with the slurry, all of the tiles are lifted out of the slurry concurrently by lifting the rack. Thereupon the truck is operated to transport the tiles to a subsequent operating station, whereupon the rack is lowered so that the tiles may rest on their lower end surfaces on a pallet or support, with the rack arms below the level of the bells. The truck is then backed away and the charge of tiles are left supported on their lower spigot ends until they are ready to be charged into the kiln. If desired, they may be transported directly to the kiln and there removed directly from the rack and charged therein. Again, they may be transported to a station and the parting material applied, and then taken to the kiln. This is particularly true when the tiles have been dried just prior to dipping and consequently have retained some of the drying heat.

In all events, during suspension, lifting, lowering, or supporting on end, on pallets, or on the floor, the tiles, in top plan view, always retain their original positions relative to each other so that the pattern of the group remains fixed, thus facilitating all operations.

It is apparent from the foregoing description that, according to the method and apparatus described, ordinary vitrified drain tile can be provided with a ceramic glaze comparable to that provided on chinaware and the higher priced clay products. At the same time, the tiles can be handled economically and the glaze so applied that the tiles will not become stuck together, or to their supports during firing in the kiln. The surfaces of the tile which are meant to be glazed are provided with a uniform smooth glaze undisturbed and undamaged by contact with any extraneous surface.

In the description, the operations are described as applied to lifting and lowering of the rack and tiles. Lifting and lowering, as used herein and in the claims, is used in its relative sense, as obviously, the tile may be supported in a fixed vertical position and the tank or layer of parting material lifted and lowered to effect the relative movement vertically, as mentioned hereinbefore, or combinations of the two may be used with like effect.

Having thus described my invention, I claim:

1. The method of coating a plurality of clay drain tiles each having a bell at one end and a spigot at the other end with ceramic glaze forming material adapted to form a ceramic glaze thereon when the article is fired, and comprising concurrently supporting the tiles, spigot ends at the bottom, on their lower ends in rows and in spaced relation to each other in a drier, drying the tile therein by heat, then concurrently passing between the rows, below the level of the bells, spaced arms of a support which are adapted to engage the undersides of all of the bells when the support is lifted, lifting the support to suspend all of the tiles by their bell ends from the support, with the bell ends upwardly, relatively moving the support over a tank of slurry of the glaze material and relatively lowering it to completely immerse the tiles, concurrently, in the slurry, while they retain a substantial portion of their drying heat, raising the support to lift the tiles from the slurry, transporting the support with the tiles suspended thereon to a subsequent operating station.

2. The method of coating a plurality of drain tiles, each having a bell at one end and a spigot at the other end, concurrently with ceramic glaze-forming material adapted to form a ceramic glaze thereon when the tiles are fired, and comprising suspending a plurality of said tiles concurrently with their bell ends upwardly and spigot ends downwardly from a support by engaging the under-surfaces of the bells so that each tile is free to shift upwardly relative to the support independently of the others upon lowering the support to dispose the spigot ends onto a common plane surface, and thereby to self-adjust themselves so that their spigot ends can be caused to rest concurrently on said common plane surface, concurrently lowering the tiles, while so supported, onto a layer of parting material to cause a coating of the parting material to adhere to the lower ends of the tiles, again supporting the tiles in the original manner by the support and lifting them concurrently from said layer, transporting the tiles, while supported in the original manner, over a tank of slurry of the glaze material, immersing the supported tiles completely, concurrently, in the slurry while so supported, and then lifting the supported tiles from the slurry and transporting them while supported in the original manner to a subsequent operating station.

3. The method of coating a plurality of drain tiles, each having a bell at one end and a spigot at the other end, concurrently with a glaze forming material adapted to form a ceramic glaze thereon when the articles are fired, and comprising suspending a plurality of said tiles concurrently with their bell ends upwardly and spigot ends downwardly from a support by engaging the under-surfaces of the bells so that each tile is free to shift upwardly relative to the support independently of the others, upon lowering the support to dispose the spigot ends onto a common plane surface and thereby to self adjust themselves so that their spigot ends can be caused to rest concurrently on said common plane surface, concurrently immersing the tiles, while so supported, in a slurry of glaze forming material, removing the tiles concurrently, while so supported, from the slurry and, while so supported and before the slurry is dry, lowering the tiles concurrently onto a layer of parting material and thereby causing a coating of parting material to adhere to the tiles, again supporting the tiles in the original manner and lifting them concurrently from said layer, and transporting them, while supported in the original manner, to a subsequent operating station.

4. The method of coating a plurality of clay drain tiles each having a bell at one end and a spigot at the other end with ceramic glaze forming material adapted to form a ceramic glaze thereon when the tiles are fired, and comprising concurrently suspending a group of said tiles from a support with the bell ends upwardly and spigot ends downwardly, by engaging the tiles on the undersurfaces of the bells so that each tile can move upwardly relative to the support independently of the others, moving the support over a tank of slurry of the glaze material and lowering it to immerse the tiles completely, concurrently, while so supported, in the slurry, raising the support to lift the tiles while so supported from the slurry, transporting the support with the tiles supported thereon to a subsequent operating station, lowering the tiles until their spigot ends rest on a supporting surface, and then removing the support.

5. The method of handling a plurality of clay tiles each having a bell at one end and a spigot at the other end, concurrently and comprising supporting concurrently a plurality of said tiles on a pallet in rows in spaced relation to each other on their spigot ends with the bells at the top, concurrently passing laterally spaced arms of a support, endwise of the arms and rows, between the rows, in spaced relation below the level of the bells, which arms are adapted to engage the undersides of all of the bells when the support is lifted and thereby lift and suspend the tiles thereby, and, while they remain in the same lateral positions relative to each other, concurrently lifting the rows of tiles by the arms and transporting the tiles while so supported over a tank of slurry of the glaze material, effecting relative vertical movement of the tank and arms to immerse completely the suspended tiles concurrently, by the arms, in the slurry, raising the suspended tiles, by the arms, from the slurry, and transporting them while so suspended to a subsequent operating station, and then lowering the support to dispose the tiles with their spigot ends on a support and the arms below the bells, and then withdrawing the arms endwise of the rows of tiles.

6. The method according to claim 5 wherein the tiles are removed from the support by lowering the support sufficiently to cause their lower ends to engage with a supporting surface, then additionally lowering the support, and finally withdrawing the arms endwise from between the rows.

References Cited in the file of this patent

UNITED STATES PATENTS

| 15,111 | Howe et al. | June 10, 1856 |
| 759,459 | Minter | Mar. 10, 1904 |
| 1,466,213 | Teetor | Aug. 28, 1923 |
| 1,835,431 | Ryerson | Dec. 8, 1931 |
| 2,581,364 | Cushman | Jan. 8, 1952 |
| 2,622,750 | Ehlers | Dec. 23, 1952 |

FOREIGN PATENTS

| 20,276 | Great Britain | A.D. 1908 |

OTHER REFERENCES

Searle: Encyclopedia of the Ceramic Industries, vol. 1, London (1929), page 310, and vol. 2, page 126.